United States Patent [19]
Iwai et al.

[11] Patent Number: 6,112,841
[45] Date of Patent: Sep. 5, 2000

[54] POSITIONING APPARATUS FOR A SPEEDOMETER GEAR BOX

[75] Inventors: Toshiyuki Iwai; Shinji Ito, both of Wako, Japan

[73] Assignee: Honda Giken Kogyo Kabushiki Kaisha, Tokyo, Japan

[21] Appl. No.: 09/165,361

[22] Filed: Oct. 2, 1998

[30] Foreign Application Priority Data

Oct. 3, 1997 [JP] Japan .................................. 9-271805
Dec. 27, 1997 [JP] Japan .................................. 9-367881

[51] Int. Cl.⁷ .................................................. F16H 37/00
[52] U.S. Cl. ................................ 180/219; 73/494; 74/12
[58] Field of Search ........................... 180/219; 73/493, 73/494; 74/12

[56] References Cited

U.S. PATENT DOCUMENTS

| | | | |
|---|---|---|---|
| 4,212,482 | 7/1980 | Rasmussen et al. | 280/828 |
| 4,582,175 | 4/1986 | Yanai | 188/18 A |
| 4,869,120 | 9/1989 | Kashiwai et al. | 74/12 |
| 4,989,468 | 2/1991 | Kumazawa | 74/12 |

*Primary Examiner*—Kevin Hurley
*Attorney, Agent, or Firm*—Birch, Stewart, Kolasch & Birch, LLP

[57] ABSTRACT

To facilitate positioning of a speedometer gear box provided between a hub and a caliper bracket. A speedometer gear box is disposed between one side face of a hub of a front wheel and a bracket boss portion of a caliper bracket for rotation on an axle. A stopper is provided at a position on an inner side surface of the caliper bracket at a location where it cannot be visually observed from the outside such that, when a link type front suspension is extended fully, a positioning projection formed on an outer periphery of the speedometer gear box secured to the axle is contacted with the stopper. An indicator is formed at a position of the inner side surface of the caliper bracket in the proximity of an end edge at which it can be visually observed readily from the outside. This position of the indicator is set such that it coincides with a registration position of the positioning projection when the front suspension is contracted by a predetermined static load

17 Claims, 8 Drawing Sheets

POSITIONING APPARATUS FOR A SPEEDOMETER GEAR BOX

BACKGROUND OF THE INVENTION

1. Field of the Invention

The present invention relates to a positioning apparatus for a speedometer gear box.

2. Description of Related Art

It is known that a caliper bracket and a speedometer gear box are provided on an axle of a front wheel of a motorcycle. The front wheel being supported on a front suspension through the axle. The caliper bracket is supported for pivotal motion on the axle in order to support a brake caliper for braking a brake disk mounted on a hub of the front wheel. The speedometer gear box is supported on the axle for detecting the speed of rotation of the front wheel and operates in response to rotation of the hub of the front wheel. The pivotal motion of the speedometer gear box is limited by a stopper disposed on the opposite side of the caliper bracket with respect to the front wheel and provided on a front fork.

When the speedometer gear box is disposed on the opposite side of the caliper bracket with respect to the front wheel as in the prior art example described above, the positional relationship of the speedometer gear box to the stopper of the front fork can be confirmed by visual observation readily without being disturbed by the caliper bracket. However, if the speedometer gear box is disposed on the same side as that of the caliper bracket, then since it becomes required to dispose the speedometer gear box between the hub and the caliper bracket and provide the speedometer gear box and the caliper bracket for pivotal motion relative to each other and provide the stopper on an inner side surface (a face adjacent the speedometer gear box) of the caliper bracket, the stopper comes to a position in which it is held between the caliper bracket and the hub and it is difficult to view from the outside.

Furthermore, where such a structure having the speedometer gear box and the caliper bracket located on the same side and the axle supported on a front suspension of a pivot link type is adopted, the speedometer gear box is positioned and secured in a state in which the vehicle body is assembled and the weight of the vehicle body is applied to the front suspension. However, as the front suspension is contracted by a static load of the weight of the vehicle body and so forth, the caliper bracket is pivoted around the axle. As a result, the speedometer gear box must be positioned at a position spaced away from the stopper. Therefore, the positioning operation is difficult in this state. In addition, since the stopper cannot be confirmed readily by visual observation as described above, the positioning operation is very difficult.

SUMMARY OF THE INVENTION

It is an object of the present invention to make it possible for a positioning operation to be performed readily and rapidly without the above-mentioned difficulties.

In order to solve the subject described above, according to the present invention, a positioning apparatus for a speedometer gear box for a motorcycle which includes a front wheel, an axle support member provided at a lower portion of a front suspension on which the front wheel is supported, a brake caliper for braking a brake disk mounted on a hub of the front wheel, a caliper bracket supported for pivotal motion on an axle for supporting the brake caliper, and a speedometer gear box supported on the axle for detecting a speed of rotation of the front wheel, is characterized in that the speedometer gear box is disposed for pivotal motion relative to the caliper bracket between the caliper bracket and the hub. Furthermore, a stopper for limiting the pivotal motion of the speedometer gear box in a fully extended condition of the front suspension and a positioning indicator for indicating a registration position of the speedometer gear box in a condition wherein the front suspension is contracted by a predetermined static load are provided separately from each other on a surface of the caliper bracket adjacent the speedometer gear box. The positioning indicator is disposed at a position in the proximity of an edge portion of the caliper bracket.

According to the present invention, since the speedometer gear box is provided for pivotal motion relative to the caliper bracket between the caliper bracket and the hub and the stopper is provided on the caliper bracket, if the predetermined static load is applied to the front suspension upon assembly of the vehicle body, then the caliper bracket is pivoted around the axle by contraction of the front suspension. Furthermore, the stopper is moved integrally. However, since the positioning indicator which indicates the registration position of the speedometer gear box in this condition is provided at a place different from that of the stopper on the surface of the caliper bracket adjacent the speedometer gear box, the speedometer gear box can be positioned in accordance with the positioning indicator. In addition, the positioning indicator is disposed in the proximity of an edge portion of the caliper bracket. Accordingly, although the stopper is held between the caliper bracket and the hub and cannot be visually observed readily, the speedometer gear box can be positioned readily and rapidly by visual observation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

An embodiment of the invention of the present application is described with reference to FIGS. 1 to 8.

Figure 1:
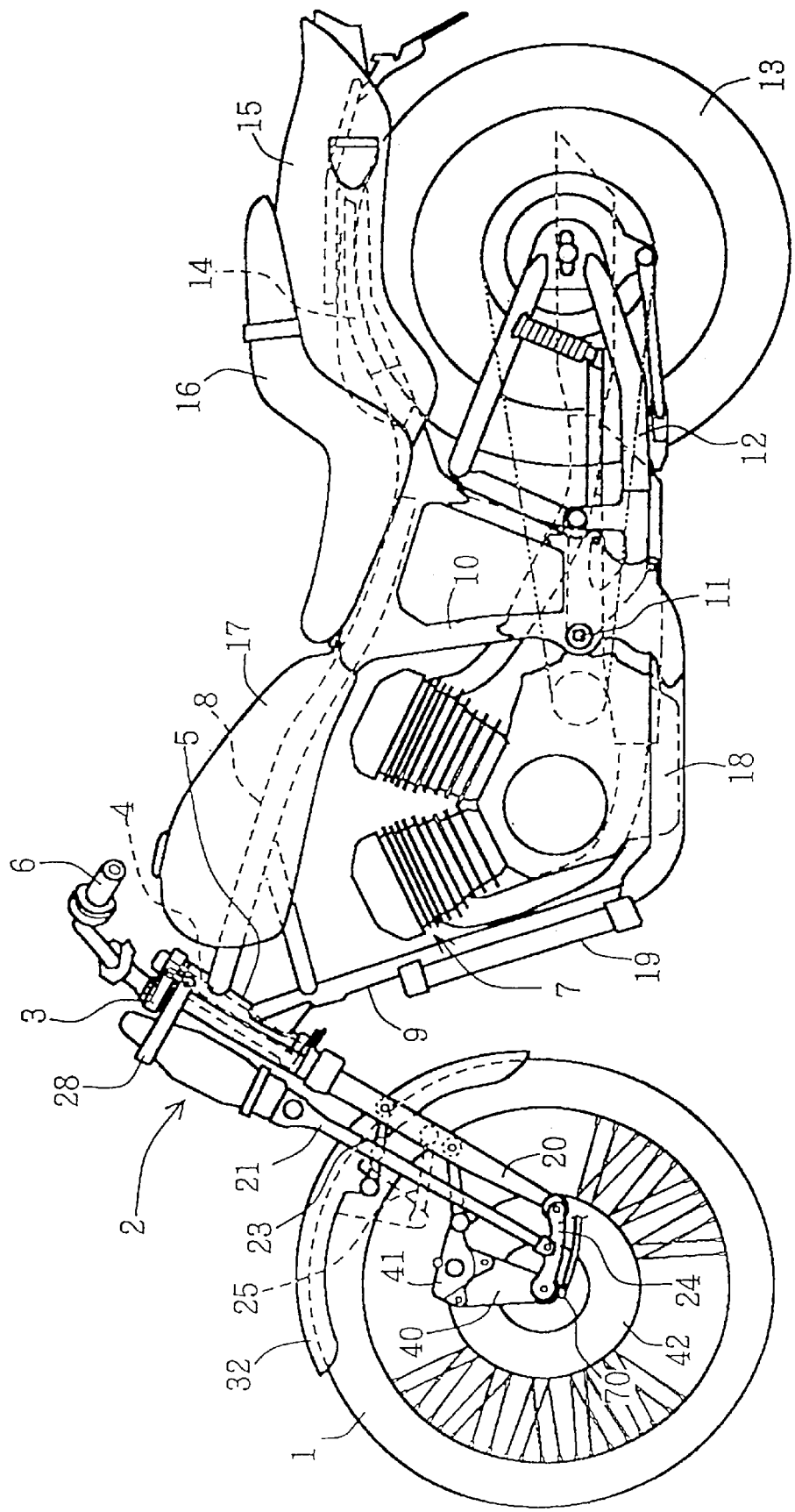
FIG. 1 is a side elevational view of a motorcycle to which the invention of the present application is applied.

First, referring to FIG. 1, a link type front suspension 2 on which a front wheel 1 is supported is connected for pivotal motion on a head pipe 5 by a stem pipe 4 with a top bridge 3 interposed therebetween such that it can be steered by a handle bar 6.

The head pipe 5 is attached to front ends of a main pipe 8 which is disposed in forward and backward directions above a V-type 4-cycle engine 7 and a front down pipe 9 which extends obliquely downwardly to the front of the V-type 4-cycle engine 7.

A rear portion of the main pipe 8 is connected to a pair of left and right pivot plates 10 which extend long in upward and downward directions. Rear swing arms 12 supported at front ends thereof on pivot portions 11 of the pivot plates 10 extend rearwardly and a rear wheel 13 is supported at rear ends of the rear swing arms 12. The rear swing arms 12 are rockable in upward and downward directions around the pivot portions 11 and form a rear suspension.

A seat rail 14 extends rearwardly from a rear portion of the main pipe 8, and a rear cowl 15 and a seat 16 are supported on the seat rail 14. A fuel tank 17 is supported on the main pipe 8 forwardly of the seat 16.

Lower end portions of the front down pipe 9 and the pivot plates 10 are connected to each other by a lower frame 18 which extends in forward and backward directions below the V-type 4-cycle engine 7, and a radiator 19 is supported on the front down pipe 9.

Figure 2:
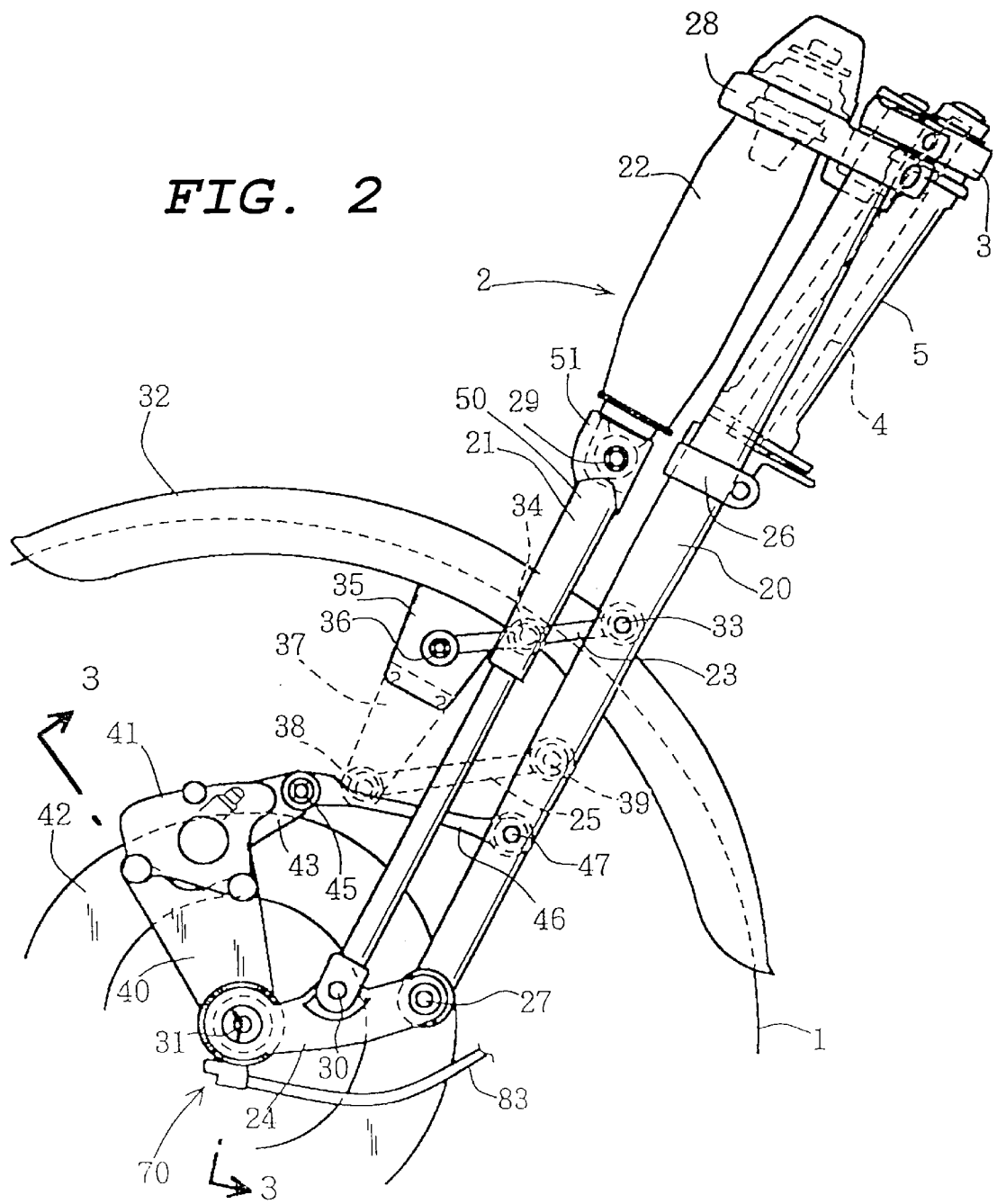
FIG. 2 is an enlarged side elevational view of a link type front suspension.

As shown in FIG. 2, the link type front suspension 2 includes a pair of left and right fork pipes 20, a pair of left and right push rods 21 and shock absorbers 22 extending in parallel to the fork pipes 20, a pair of left and right upper links 23 which interconnect intermediate portions of the push rods 21 and the shock absorbers 22 in upward and downward directions, and a pair of pivot links 24 which interconnect lower end portions of the push rods 21 and the shock absorbers 22. The pivot links 24 are an example of the axle support member in the invention of the present application.

Meanwhile, the fork pipe 20 on the right side of the vehicle body includes a fender link 25 which is connected at one end thereto to an intermediate portion of the fork pipe 20 in the upward and downward directions between the connection portions of the fork pipe 20 to the upper link 23 and the pivot link 24 and is connected at the other end thereof to a front fender (which will be hereinafter described).

The left and right fork pipes 20 are connected at upper end portions thereof to each other by the top bridge 3, and are connected at intermediate portions thereof to a steering stem 26. The top bridge 3 and the steering stem 26 are connected at middle portions thereof to the stem pipe 4, and the stem pipe 4 is supported for pivotal motion in the head pipe 5.

Each of the fork pipes 20 is a tapered pipe member which is formed such that a portion thereof, which is higher than the connection portion thereof to the steering stem 26, tapers upwardly. The other portion thereof, which is lower than the connection portion similarly tapers downwardly. The fork pipes 20 can be manufactured by a known method in which a pipe member extruded straight is worked into a tapered shape by swaging. Lower end portions of the fork pipes 20 are pivotally connected to end portions of the pivot links 24 by shafts 27.

The shock absorbers 22 are each formed from a known fluidic damper in which a damper spring is built. Upper end portions of the shock absorbers are supported at a front portion of an upper bracket 28, while lower end portions thereof are pivotally connected to upper end portions of the push rods 21 by a shaft 29.

Each of the push rods 21 is a pipe member which extends downwardly substantially in parallel to the fork pipes 20, and a lower end portion thereof is pivotally connected to an intermediate portion of the pivot link 24 by a shaft 30. The other end portions of the pivot links 24 are pivotally connected to an axle 31 of the front wheel 1.

The upper links 23 are disposed in the proximity of a front fender 32 disposed between the left and right fork pipes 20 and the push rods 21. One end portion of the upper link is pivotally connected to the fork pipes 20 by a shaft 33 while intermediate portions thereof are pivotally mounted on the push rods 21 by shafts 34. The length of the upper links 23 between the shafts 33 and 34 and the length of the pivot links 24 between the shafts 27 and axle 31 are substantially equal to each other.

Accordingly, substantially parallelogram link mechanisms are formed from the fork pipes 20, push rods 21, upper links 23 and pivot links 24 such that the push rods 21 may move substantially in parallel to the fork pipes 20 when the front wheel 1 is moved upwardly or downwardly.

Front end portions of the left and right upper links 23 extend forwardly farther than the push rods 21, and the ends of the extensions of them are pivotally connected to stays 35, which extend downwardly from the front fender 32, by shafts 36.

Furthermore, on the right side of the vehicle body, the fender link 25 is disposed substantially in parallel at a position lower than the mounting position of the upper link 23 thereon, and is pivotally connected at one end thereof to a stay 37 by a shaft 38 and is pivotally connected at the other end thereof to the fork pipe 20 by a shaft 39. The stay 37 extends downwardly further than the stay 35 of the front fender 32 on the right side of the vehicle body.

A line which interconnects the shafts 36 and 38 of the stays 35 and 37 extends substantially in parallel to the axial line of the fork pipes 20. A substantially parallelogram link mechanism is formed from the upper link 23 on the left side of the vehicle body, the fender link 25 on the right side of the vehicle body, the front fender 32 which has the stays 35 and 37, and the fork pipe 20 such that the front fender 32 is moved upwardly or downwardly substantially in parallel in response to an upward or downward movement of the front wheel 1.

One end of a caliper bracket 40 is supported for pivotal motion around the axle 31, and a caliper 41 is supported at the other end of the caliper bracket 40 such that it slidably contacts, upon braking, with the brake disk 42 and is directly acted upon by a braking force.

A stay 43 which projects rearwardly is formed integrally on the caliper 41. One end of a torque link 46 is pivotally connected to the stay 43 by a shaft 45, while the other end is pivotally connected to the fork pipe 20 by a shaft 47.

Figure 3:
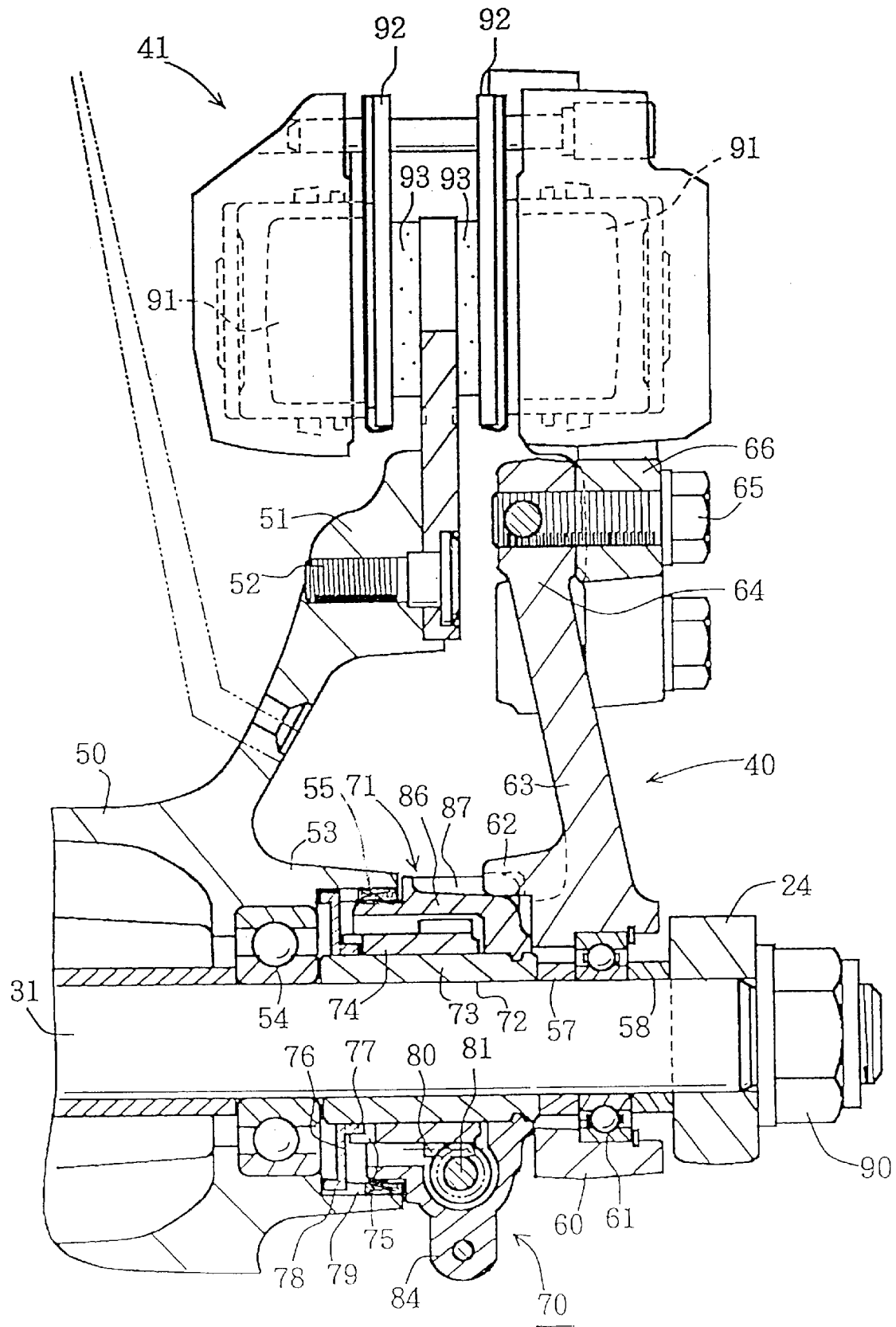
FIG. 3 is a sectional view taken along line 3—3 of FIG. 2.

As shown in FIG. 3, the brake disk 42 which forms a front wheel brake apparatus, is mounted on a disk flange 51 having a large diameter formed on one side face of a hub 50 of the front wheel by a bolt 52.

A boss portion 53 having a small diameter which projects sidewardly is formed on the inner side of the disk flange 51. The boss portion 53 is supported for rotation on the axle 31 by a ball bearing 54 while a seal 55 is fitted in an inner face of the boss portion 53 on the projecting end side.

A bracket boss portion 60 formed integrally with the caliper bracket 40 on an inner periphery side of the seal 55 is supported for pivotal motion on the axle 31 by means of a ball bearing 61. A stopper 62 is formed at a portion of the bracket boss portion 60 which forms part of an inner side surface of the caliper bracket 40 opposing the boss portion 53 having a small diameter and projects substantially in parallel to the axle 31 toward the boss portion 53.

A body portion 63 of the caliper bracket 40 extends upwardly from the bracket boss portion 60, and a mounting portion 66 of the brake caliper 41 is removably connected at a boss portion 64 at an upper portion of the body portion 63 by a bolt 65.

Figure 9:
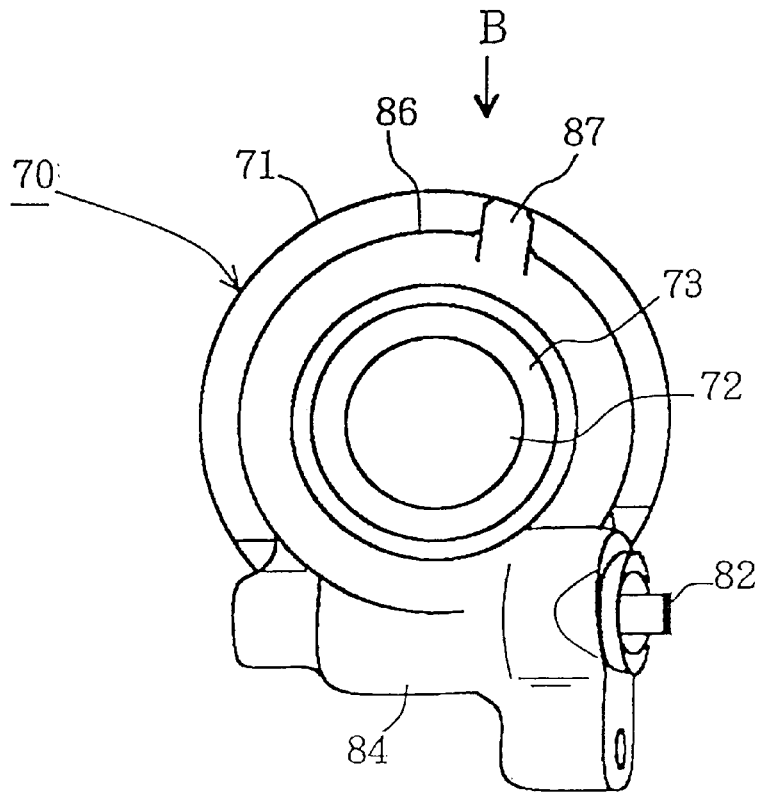
FIG. 9 is a side elevational view of a speedometer gear box.
Figure 10:
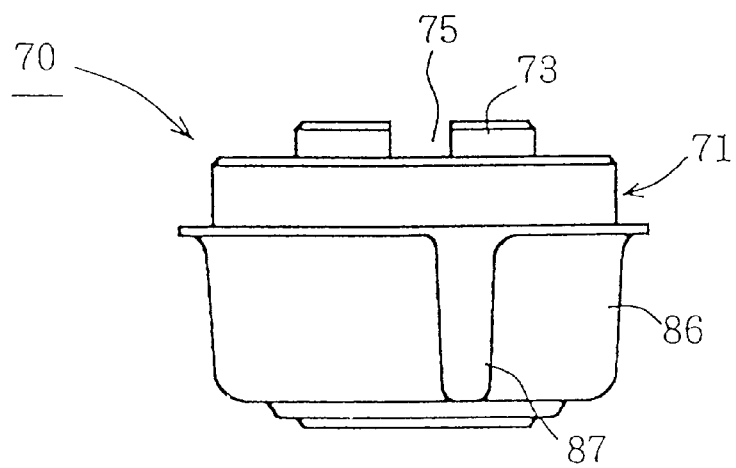
FIG. 10 is a view in the direction of arrow B in FIG. 9.

A speedometer gear box 70 is supported on the axle 31 between the boss portion 53 having a small diameter and the caliper bracket 40. The speedometer gear box 70 itself is substantially the same as a known gear box, and includes, as shown also in FIGS. 9 and 10, a mounting portion 71 and is fixedly fastened for integral pivotal motion around the axle 31 extending through a through-hole 72 formed at a middle portion of the mounting portion 71.

A rotary shaft 74 is supported for rotation around a tubular portion 73 which surrounds the through-hole 72. One end of the rotary shaft 74 forms a projecting end which is fitted on the inner side adjacent the boss portion 53. A slotted portion 75 is formed at a projecting end face of the same.

An inner periphery side pawl portion 77 of a connection ring 76 supported for rotation on the tubular portion 73 is engaged with the slotted portion 75, and an engaging portion 78 formed on an outer peripheral portion of the connection ring 76 is engaged with a grooved portion 79 formed on an inner peripheral face of the boss portion 53.

Consequently, the front wheel 1 and the rotary shaft 74 are rotated in synchronism with each other through the connection ring 76 and the boss portion 53, and the rotation is transmitted to a gear 80 provided on the other end side and a pinion gear 81 held in meshing engagement with the gear 80. Furthermore, the rotation is transmitted from a shaft end portion 82 of the pinion gear 81 through a cable 83 (FIG. 2) to a speedometer (not shown), by which the vehicle speed is indicated. Reference numeral 84 denotes a gear case, which is formed integrally below the mounting portion 71.

A positioning projection 87 which projects in a diametrical direction and extends in an axial direction is formed integrally on an outer peripheral face of a housing 86 which forms the outer periphery side of the mounting portion 71. A portion of the positioning projection 87, adjacent the caliper bracket 40, overlaps with the stopper 62 and is positioned such that, in a fully extended condition of the link type front suspension 2, that is, in a condition wherein the front wheel 1 is lifted afloat to put the shock absorbers 22 into a fully extended condition and lower end portions of the push rods 21 are moved downwardly, the positioning projection 87 contacts with the stopper 62.

It is to be noted that one end side of the tubular portion 73 of the speedometer gear box 70 contacts with a side face of an inner race of the ball bearing 54, and a collar 57 is provided between the other end side of the tubular portion 73 and the ball bearing 61 of the bracket boss portion 60. Also between the ball bearing 61 and the pivot link 24, a collar 58 is provided.

Accordingly, if one end of the axle 31 is fastened by an axle nut 90, then the opposite ends of the tubular portion 73 are tightened by the ball bearing 54 and the collar 57. As a result, the speedometer gear box 70 is fixed on the axle 31 such that it can make no relative pivotal motion to the axle 31.

As can be apparently seen from FIGS. 4 to 8, on an inner side face of the body portion 63 of the caliper bracket 40 (a face opposing the center side of the vehicle body), the stopper 62 is formed at a location which cannot be observed from the outside, and an indicator 68 is formed in a projected form at a position which is on a concentric circle with the stopper 62 around the bracket boss portion 60 and extends to an end edge 67 of the caliper bracket 40.

Figure 7:
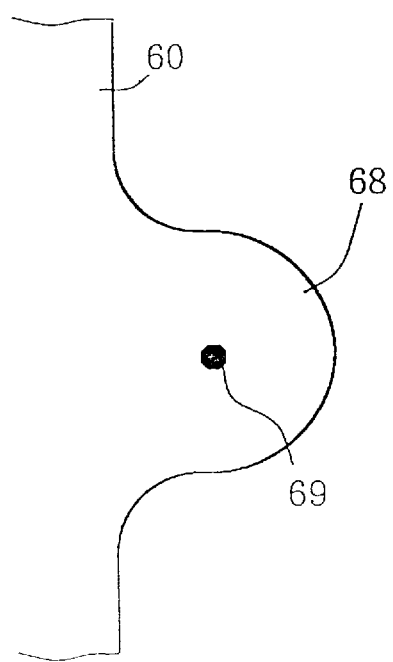
FIG. 7 is a view in the direction of arrow A in FIG. 6.
Figure 8:
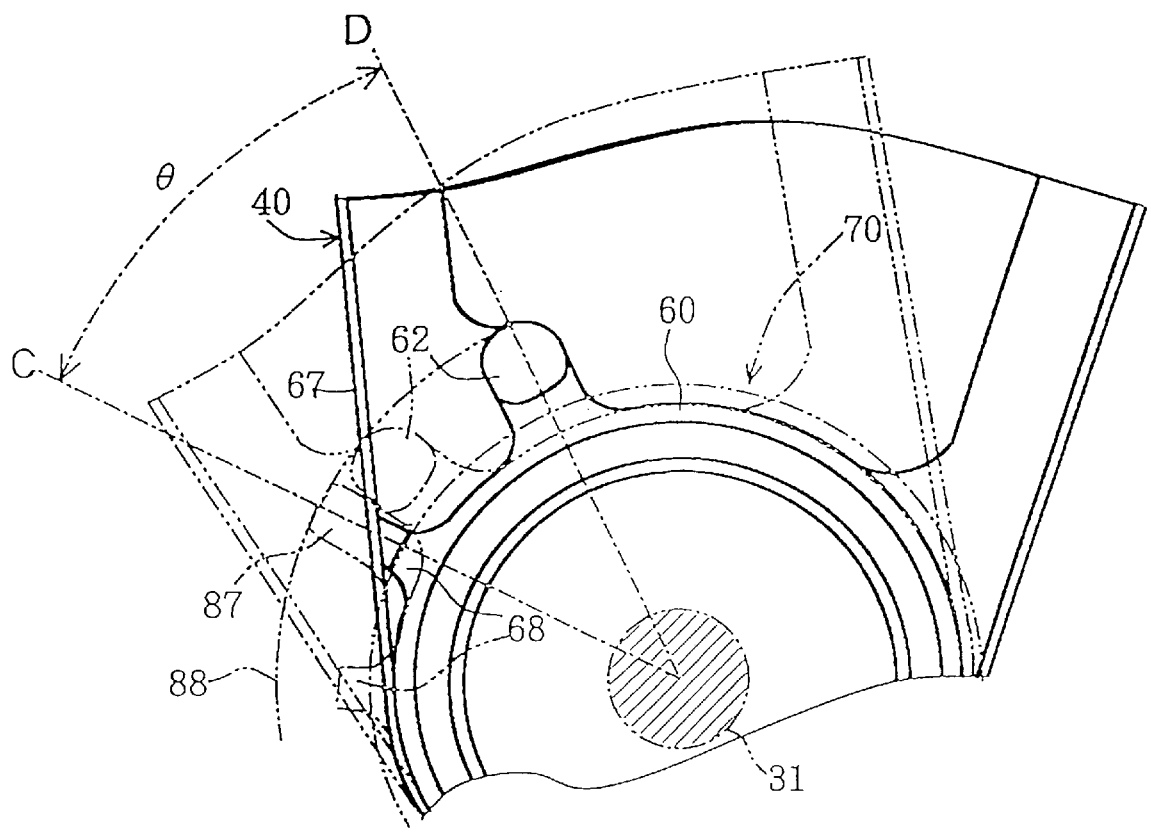
FIG. 8 is a view illustrating operation of the present invention.

However, the projecting height of the indicator 68 in a radial direction of the bracket boss portion 60 is lower than the stopper 62 so that it does not interfere with the positioning projection 87 when it turns (FIG. 8). Furthermore, as shown in FIG. 7, the shape of the indicator 68 when it is viewed in a direction indicated by an arrow A in FIG. 6 (in a direction perpendicular to the axis of the axle 31) has a substantially semi-circular shape, and a mark 69 is formed at the center of the indicator 68.

Figure 4:
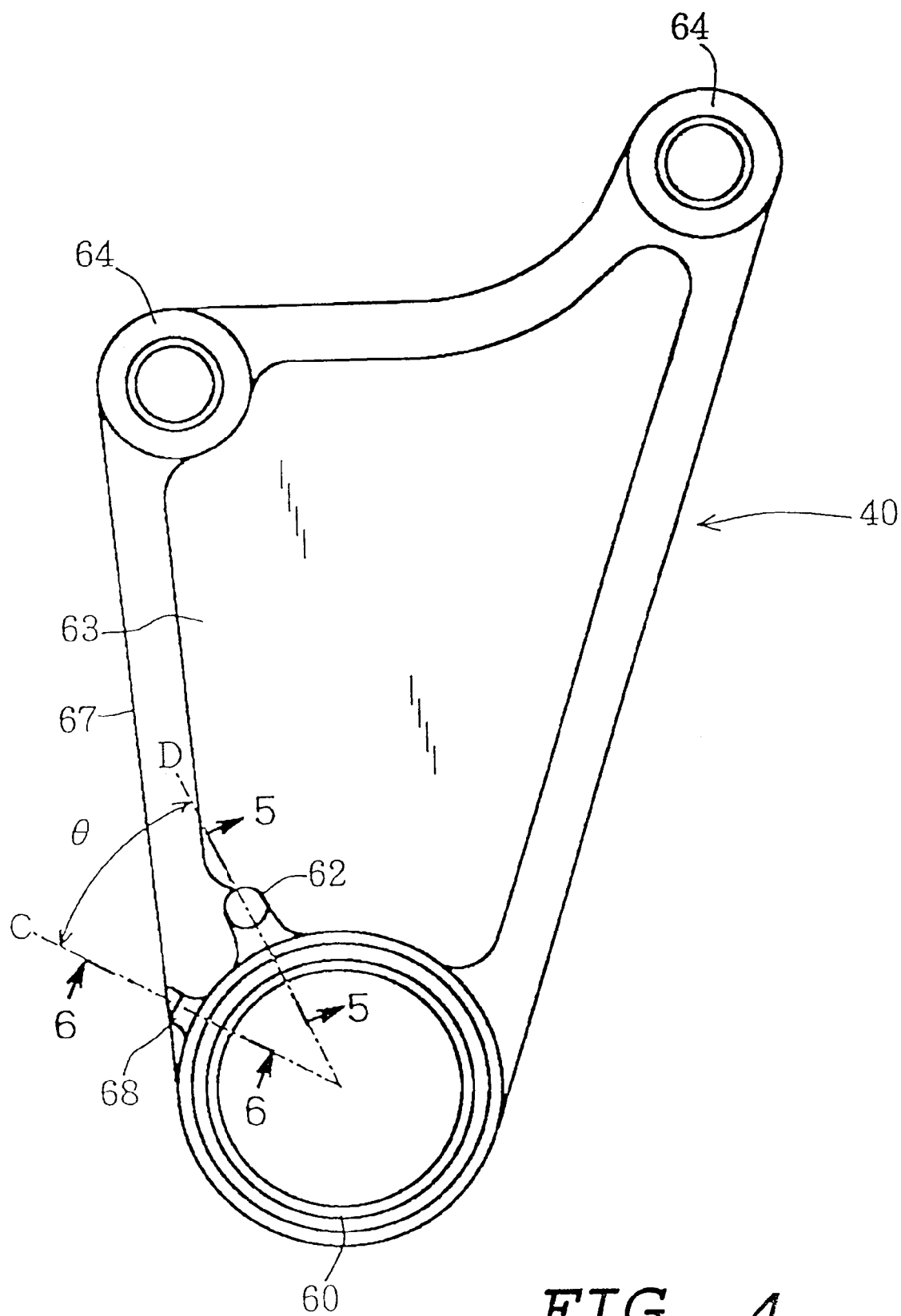
FIG. 4 is a view showing a caliper bracket from the inner side of a vehicle body.
Figure 5:
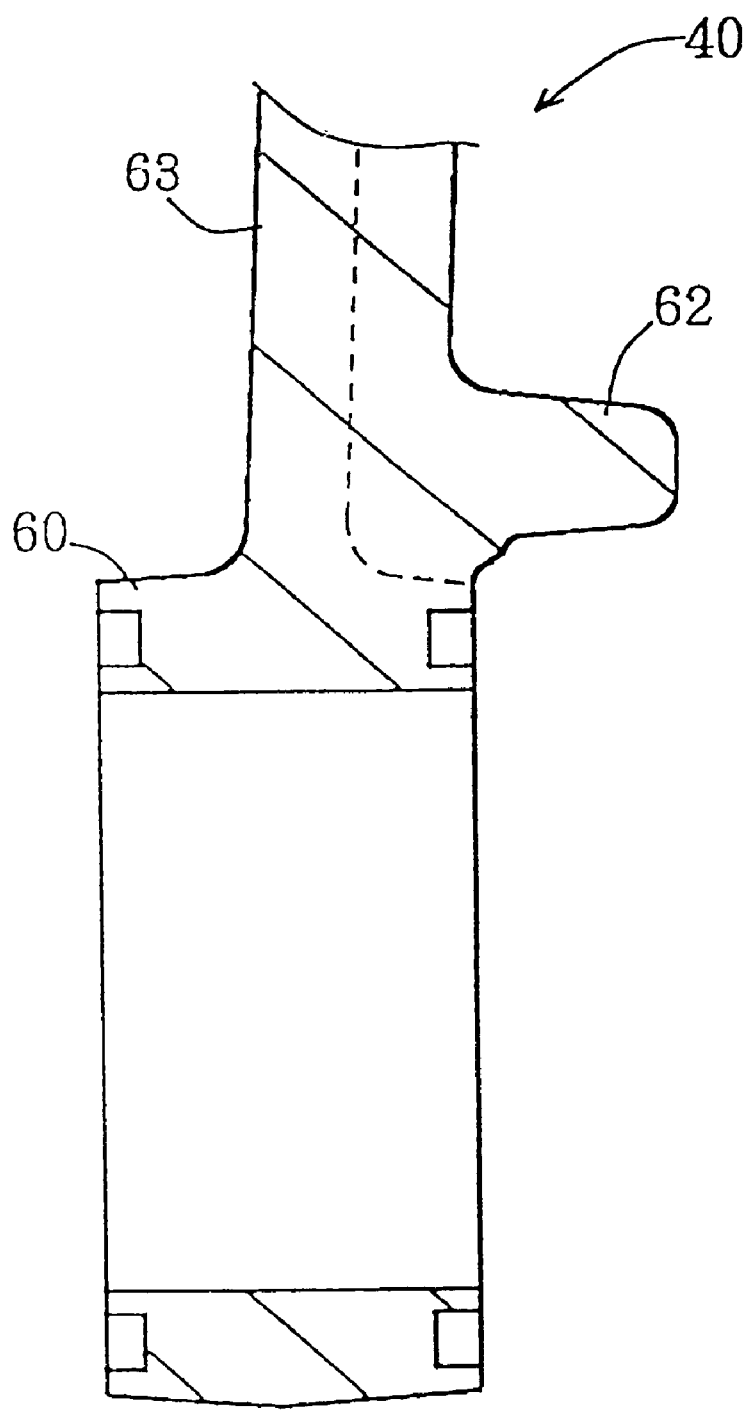
FIG. 5 is a sectional view taken along line 5—5 of FIG. 4.
Figure 6:
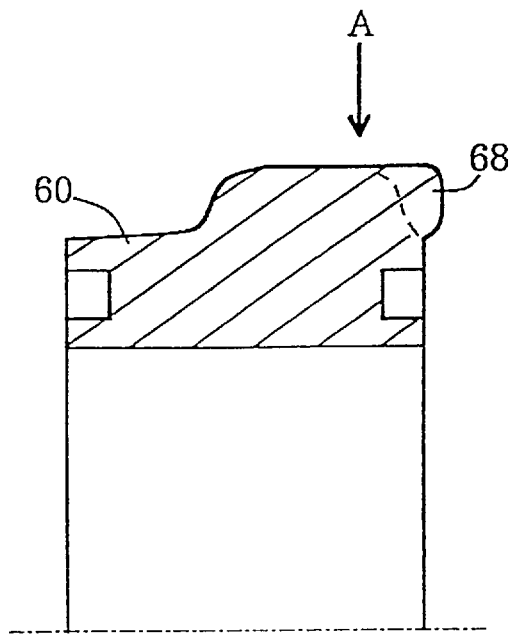
FIG. 6 is a sectional view taken along line 6—6 of FIG. 4.

The position of the indicator 68 is a position opened by a predetermined angle θ with respect to the stopper 62 (FIG. 4). This angle θ is an angle over which the caliper bracket 40 is pivoted as the front suspension 2 changes from its fully extended condition to another condition wherein it is contracted by the predetermined static load.

In particular, as shown in FIG. 8, when the predetermined static load such as the weight of the vehicle body is applied to the front suspension 2 to contract the front suspension 2 after the speedometer gear box 70 is fixed such that the positioning projection 87 contacts with the stopper 62 in the fully extended condition of the front suspension 2, the caliper bracket 40 is pivoted by the angle θ in a direction toward mark D around the axle 31 by the torque link 46, whereupon the indicator 68 is moved to the position where the stopper 62 was located when the front suspension 2 was in the fully extended condition. As a result, the positioning projection 87 is opened by the angle θ from the stopper 62 while it is registered with the indicator 68 instead. Full line conditions of the stopper 62 and the indicator 68 of FIG. 8 illustrate conditions after the condition pivoted by the angle θ, and imaginary line conditions illustrate conditions in the fully extended condition of the suspension 2.

It is to be noted that reference numeral 88 in FIG. 8 denotes a locus of pivotal motion of the top portion of the positioning projection 87. Furthermore, reference numeral 90 in FIG. 3 denotes an axle nut for securing the axle 31, reference numeral 91 is a piston, 92 is a support plate, and 93 is a brake pad.

In the following, operation of the present embodiment is described. The speedometer gear box 70 and the caliper bracket 40 are mounted onto the axle 31 which projects from the boss portion 53 of the hub. The projecting portion 75 is fitted into an engaging recessed portion formed on the boss portion 53. Furthermore, the hub 50 and the rotary shaft 74 are connected for integral rotation, and axial end portions of the axle 31 are temporarily fastened securely to the pivot links 24 by the axle nut 90.

Thereafter, the caliper 41 is mounted onto the boss portion 64 of the caliper bracket 40, and the stay 43 of the same is connected to the fork pipe 20 by the torque link 46. Furthermore, other members such as the link type front suspension 2 are mounted to assemble the vehicle body. In this stage, the speedometer gear box 70 can be pivoted freely on the axle 31.

After the vehicle body is assembled, if the predetermined static load such as the weight of the vehicle body is applied to the front suspension 2, then the front suspension 2 is contracted in conformity with the static load and also the pivot links 24 are rocked by the predetermined amount while the caliper bracket 40 is pivoted by the angle 0 in the direction of the mark D of FIG. 4.

In this condition, the speedometer gear box 70 is pivoted around the axle 31 until the positioning projection 87 is registered with the mark 69 of the indicator 68 as shown in FIG. 8, and the axle nut 90 is tightened to secure the speedometer gear box 70 to the axle 31 such that it cannot make a pivotal motion relative to the axle 31.

Consequently, the speedometer gear box 70 is positioned at the predetermined registration position, and when the link type front suspension 2 is extended fully, the caliper bracket 40 is pivoted by the angle θ in the direction indicated by the mark C of FIG. 8 and the stopper 62 is moved to the position of the indicator 68 which was registered with the positioning projection 87 so that it contacts the positioning projection 87.

In addition, since the indicator 68 is at the position in the proximity of the end edge 67 of the caliper bracket 40 at which it can be observed readily from the outside, the positioning operation can be performed readily and rapidly by visual observation. Accordingly, although the construction wherein the speedometer gear box 70 is disposed between the hub 50 and the caliper bracket 40 and the stopper 62 must be provided at a position on the inner side of the caliper bracket 40 at which it can hardly be visually observed from the outside, the positioning of the speedometer gear box 70 is possible.

It is to be noted that the invention of the present application is not limited to the embodiment described above and can be modified in various forms, and as regards the front suspension, it can be applied to various types only if a pivot link is adopted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A positioning apparatus for a speedometer gear box for a motorcycle, the motorcycle including a front wheel supported on an axle; a front suspension having an axle support member provided at a lower portion thereof on which the axle is supported; a brake disk mounted on a hub of the front wheel; a brake caliper for braking the brake disk; and a speedometer gear box supported on the axle for detecting a speed of rotation of the front wheel, said positioning apparatus comprising:

a caliper bracket supported for pivotal motion on the axle for supporting the brake disk;

said speedometer gear box is disposed for pivotal motion relative to said caliper bracket between said caliper bracket and the hub;

a stopper for limiting the pivotal motion of said speedometer gear box in a fully extended condition of the front suspension;

a positioning indicator for indicating a registration position of said speedometer gear box in a condition wherein the front suspension is contracted by a predetermined static load;

said stopper and said positioning indicator are provided separately from each other on a surface of said caliper bracket adjacent said speedometer gear box; and said positioning indicator is disposed at a position in the proximity of an edge portion of said caliper bracket.

2. The positioning apparatus according to claim 1, wherein said speedometer gear box includes a positioning projection extending radially therefrom, said stopper extends from said surface of said caliper bracket sufficiently to engage with said positioning projection when said stopper is in rotational alignment with said positioning projection.

3. The positioning apparatus according to claim 2, wherein said positioning indicator does not extend from said surface of said caliper bracket sufficiently to engage with said positioning projection when said positioning indicator is in rotational alignment with said positioning projection.

4. The positioning apparatus according to claim 3, wherein said positioning indicator includes a mark formed thereon at a central portion thereof in order to aid in positioning said positioning projection with respect to said positioning indicator.

5. The positioning apparatus according to claim 1, wherein said stopper and said positioning indicator are rotationally offset from each other on said surface of said caliper bracket.

6. The positioning apparatus according to claim 1, wherein said caliper bracket includes a boss portion formed thereon for supporting said caliper bracket on the axle, said stopper and said positioning indicator are formed on said boss portion.

7. The positioning apparatus according to claim 6, wherein said stopper includes a first portion extending radially outwardly from said boss portion and a second portion extending axially from an end of said first portion.

8. The positioning apparatus according to claim 6, wherein said positioning indicator includes a first portion extending radially outwardly from said boss portion and a second portion extending axially from an end of said first portion.

9. A motorcycle, comprising:

a front wheel supported on an axle;

a front suspension having an axle support member provided at a lower portion thereof on which said axle is supported;

a brake disk mounted on a hub of said front wheel;

a brake caliper for braking said brake disk;

a caliper bracket supported for pivotal motion on said axle for supporting said brake caliper;

a speedometer gear box supported on said axle for detecting a speed of rotation of said front wheel, said speedometer gear box being disposed for pivotal motion relative to said caliper bracket between said caliper bracket and said hub;

a stopper for limiting the pivotal motion of said speedometer gear box in a fully extended condition of said front suspension;

a positioning indicator for indicating a registration position of said speedometer gear box in a condition wherein said front suspension is contracted by a predetermined static load; and wherein said stopper and said positioning indicator are provided separately from each other on a surface of said caliper bracket adjacent said speedometer gear box, said positioning indicator being disposed at a position in the proximity of an edge portion of said caliper bracket.

10. The motorcycle according to claim 9, wherein said speedometer gear box includes a positioning projection extending radially therefrom, said stopper extends from said surface of said caliper bracket sufficiently to engage with said positioning projection when said stopper is in rotational alignment with said positioning projection.

11. The motorcycle according to claim 10, wherein said positioning indicator does not extend from said surface of said caliper bracket sufficiently to engage with said positioning projection when said positioning indicator is in rotational alignment with said positioning projection.

12. The motorcycle according to claim 11, wherein said positioning indicator includes a mark formed thereon at a central portion thereof in order to aid in positioning said positioning projection with respect to said positioning indicator.

13. The motorcycle according to claim 9, wherein said stopper and said positioning indicator are rotationally offset from each other on said surface of said caliper bracket.

14. The motorcycle according to claim 9, wherein said caliper bracket includes a boss portion formed thereon for supporting said caliper bracket on said axle, said stopper and said positioning indicator are formed on said boss portion.

15. The motorcycle according to claim 14, wherein said stopper includes a first portion extending radially outwardly from said boss portion and a second portion extending axially from an end of said first portion.

16. The motorcycle according to claim 14, wherein said positioning indicator includes a first portion extending radially outwardly from said boss portion and a second portion extending axially from an end of said first portion.

17. A positioning apparatus for a speedometer gear box for a motorcycle, the motorcycle having a suspension for supporting an axle, the axle for supporting a speedometer gearbox and a hub of a front wheel, said positioning apparatus comprising:

a caliper bracket supportable for pivotal motion on the axle of the motorcycle adjacent the speedometer gear box;

a stopper formed on the caliper bracket for limiting the pivotal motion of the speedometer gear box in a fully extended condition of the front suspension; and a positioning indicator formed on said caliper bracket for indicating a registration position of the speedometer gear box in a condition wherein the front suspension is contracted by a predetermined static load.

* * * * *